Figures 1, 2:
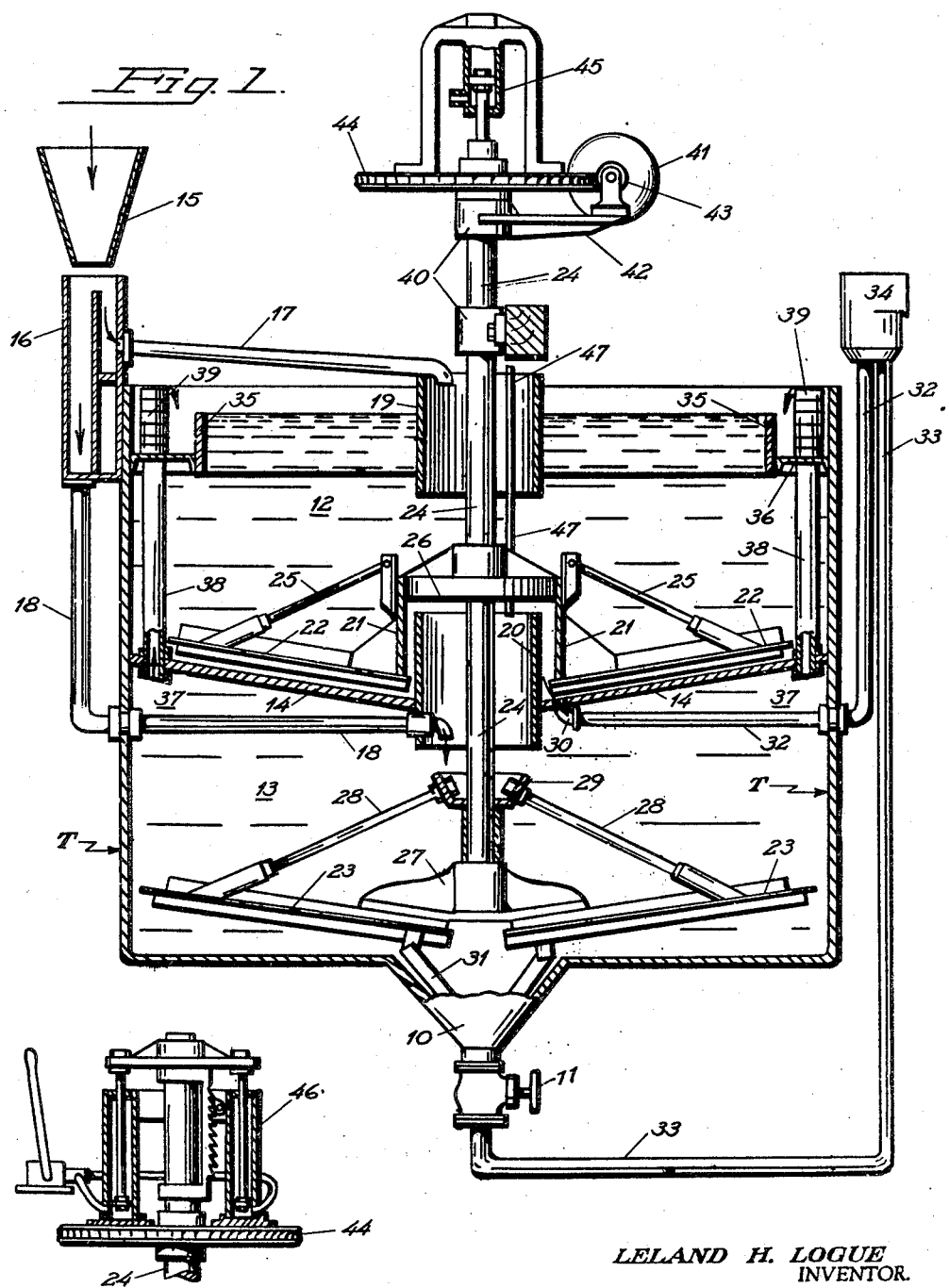

Feb. 8, 1949.  L. H. LOGUE  2,460,834
SETTLING METHOD AND APPARATUS
Original Filed Jan. 26, 1937

LELAND H. LOGUE
INVENTOR.

ATTORNEY.

Patented Feb. 8, 1949

2,460,834

UNITED STATES PATENT OFFICE 2,460,834

SETTLING METHOD AND APPARATUS

Leland H. Logue, Denver, Colo., assignor, by mesne assignments, to Mining Process and Patent Company, a corporation of Delaware Original application January 26, 1937, Serial No. 122,371. Divided and this application August 13, 1945, Serial No. 610,412

15 Claims. (Cl. 210—55)

This invention relates to thickeners, and more particularly to a method of and apparatus for the treatment of a liquid-solids suspension, as in a thickener in which two or more trays are mounted in a single tank for simultaneous operation of the settling zones provided by the trays. The present application is a division of my application Ser. No. 122,371, filed January 26, 1937, now Patent 2,402,649, granted June 25, 1946.

The method and apparatus of this invention provide improvements in thickening operations, sometimes known as continuous gravity settling processes, wherein solid constituents of the material being treated are settled out of the liquid in which the solids are suspended, in a container or tank constructed especially for such purpose. The settled solids are removed in thickened condition through a suitable outlet, while clarified liquid rising from the thickened matter is removed by overflow. In such operations, it is desired to discharge separately settled solids and clarified liquid in a continuous operation, and to thicken the settled solids to a predetermined, regulatable degree of density.

Among the objects of this invention are to provide a method of treating a liquid-solids suspension in a plurality of superposed settling zones having physical communication therebetween; to provide such a method by which an effective seal is provided between the superposed zones, for simultaneous operation of each of the zones as substantially independent units; to provide such a method by which the seal between adjacent zones is effectively controlled and may be adequately regulated; to provide improved apparatus for carrying out the above method; to provide such apparatus which includes a tank divided into superposed but physically communicating compartments; to provide such apparatus in which the compartments are simultaneously operable as substantially independent thickener units; to provide such apparatus in which a seal between adjacent compartments may be maintained positively and controlled effectively; to provide thickener apparatus which has an increased capacity and occupies less floor space than multiple thickener units heretofore constructed; to provide thickener apparatus which is more effective in operation and requires less attendance and a smaller number of operators; to provide a multiple thickener unit in a single tank; to provide a multiple unit thickener in a single tank wherein a positive seal is provided between superposed units to prevent movement of material in one unit into the unit next below; to provide a multiple unit thickener in a single tank in which the discharge of material under treatment is effectively controlled; to provide such apparatus wherein repairs may be carried out with facility and the time spent in cleaning operations, and the like, is reduced to a minimum; and to provide such apparatus which is highly efficient in operation.

Other objects and the novel features of this invention, including novel details of construction and novel combinations and arrangements of parts, will appear more fully in the course of the following description.

In accordance with this invention, a liquid-solids suspension may be treated by establishing a plurality of superposed and physically communicating settling zones, dividing incoming feed and simultaneously supplying a divided portion thereof to each zone, simultaneously removing settled solids from the lower portion of each zone, simultaneously removing clarified liquid from the upper portion of each zone, and establishing a pressure seal between adjacent zones to prevent movement of matter from each zone to the next lower zone by discharging clarified liquid from each zone at a point elevated with respect to the uppermost of the zones. By the foregoing, a body of solids in liquid is maintained in each of the superposed settling zones, and, in further accordance with this invention, the hydrostatic pressure in each lower zone or body is controlled by the point of elevated discharge of clarified liquid, and the rate of withdrawal of solids from the body next above is also controlled, so as to continuously prevent the passage of matter downwardly through the restricted zone between adjacent superposed bodies.

Apparatus for carrying out the above method may be constructed as illustrated in the accompanying drawing, in which:

Fig. 1 is a vertical sectional view of thickening apparatus embodying features of the present invention; and Fig. 2 is a vertical section through a modified form of hydraulic lifting device with which the thickening apparatus of Fig. 1 may be equipped.

As illustrated in Fig. 1, apparatus constructed in accordance with this invention may comprise a tank T, preferably cylindrical, and provided with a sump 10 at the bottom thereof. The sump is preferably conical in shape and provided with an outlet controlled by a valve 11. The tank is divided into an upper compartment 12 and a lower compartment 13 by a dished or dihedral partition 14, which may be attached to the inner circumferential surface of the tank in a suitable manner, and which is provided with a central aperture for communication between the upper and lower compartments. Each compartment is preferably operated as a separate settling unit, and an adequate seal is maintained, as will appear later, to prevent the passage of material from the upper to the lower compartment through the aperture, which tends to equalize the pressure between the compartments, as there is normally no particular disadvantage in passage of liquid from the lower to the upper compartment in equalizing such pressure.

Material to be treated passes from a feed box 15 to a common supply member 16, such as a conventional-type splitter, so that the feed will be divided substantially equally and pass to the upper and lower compartments through conduits 17 and 18, respectively. From conduit 17, feed material passes to a cylindrical feed well 19, disposed centrally at the upper end of the tank, while from conduit 18, feed passes to the upper end of the lower compartment, preferably being discharged within a tube 20. Tube 20 extends upwardly in the central aperture of partition 14, and may be attached to the partition in a suitable manner, as by welding. Tube 20 not only acts as a feed well, but further acts to prevent a direct flow of settled solids from the upper compartment to the lower compartment, and, in conjunction with other parts, including a rotating ring or collar 21, forms a labyrinth seal between the compartments.

Solids settling downwardly in the upper and lower compartments, respectively, are moved toward the center by rakes 22 and 23, which are rotated by a vertical shaft 24, which in turn extends centrally through feed well 19 and downwardly through the aperture in partition 14 to the lower end of the tank. Rakes 22 extend outwardly substantially to the wall of the tank, and also inwardly to collar 21, being supported by rods 25 attached to a hub 26, to which collar 21 is also attached. Hub 26 is attached to shaft 24, and rakes 23 extend from a lower hub 27, preferably at a slight upward inclination, substantially to the inner wall of the tank. Rakes 23 are attached to hub 27 at their inner ends, and supported at their outer ends by rods 28 which extend outwardly and downwardly from an upper hub 29.

Rakes 22 move settled solids in the upper compartment toward an outlet 30 adjacent tube 20, while rakes 23 in the lower compartment move settled solids toward sump 10, scrapers 31 being attached to the lower rakes (or to the hub 27, if desired) for moving settled solids through the sump and preventing clogging thereof. The rakes are moved relatively slowly, and the settled solids, passing to outlet 30 of the upper compartment, and into sump 10 from the lower compartment, are removed to an elevated point of discharge through conduits 32 and 33, respectively, by a pump 34. Preferably, pump 34 is of the duplex type, and provided with separate compartments for removing settled solids through conduits 32 and 33. A diaphragm pump of the type described and claimed in my United States Patent No. 2,031,609, granted February 25, 1936, is well suited for this purpose.

Clarified liquid, rising to the top of the upper compartment, overflows a ring or weir 35 into a launder 36, the ring forming the inner edge of the launder. Similarly, clarified liquid rising in the lower compartment to an annular pocket 37, formed beneath partition 14, passes upwardly through a plurality of vertical discharge conduits 38, which extend upwardly through the upper compartment and into launder 36. The height of the overflow discharge from conduits 38 into launder 36 may be controlled by an increase or decrease in the number of rings 39 in a column at the upper end of each conduit 38.

Shaft 24 may be supported in suitable bearings 40, and is driven by a motor 41 mounted on a platform 42. Motor 41 drives a worm 43, engaging a gear 44 keyed, or otherwise suitably secured, to the upper end of shaft 24. A hydraulic lifting device 45, as in Fig. 1, may also be provided for raising and lowering the rakes 22 and 23 as desired. Or, an alternative type of hydraulic lifting device may be utilized, such as lifting device 46 of Fig. 2. Since these lifting devices form no part of the present invention, and have been illustrated merely to show an operative assembly of parts, a detailed description of their construction appears unnecessary.

During operation of the thickener, the lower compartment 13 is maintained under pressure through discharge from clarified liquid conduit 38 at a higher elevation than the overflow of clarified liquid from upper compartment 12, the latter being determined by ring or overflow weir 35. The elevation at which discharge from conduits 38 is to take place may be determined initially in accordance with the density of the material to be treated in the tank, and rings 39 are preferably of different thickness, so that any desired discharge elevation may be obtained by proper ring selection.

The pressure created in the lower compartment is maintained therein due to the balance of the pressure of the thickened solids in the upper compartment above partition 14. The pulp collected around tube 20 maintains sufficient pressure due to the increased density of the thickened solids, to prevent any escape of solids through the labyrinth seal provided by tube 20, collar 21, and hub 26, as long as a condition near equilibrium is established by the balance between the density of the thickened solids above partition 14, and the pressure created by the height of overflow of clarified liquid from discharge conduits 38. The height of the discharge conduits is preferably adjusted so that there will be no tendency for thickened solids to pass from the upper compartment through the labyrinth seal to the lower compartment, and so that if there is any tendency for passage between the compartments, it will be the tendency for liquid to pass from the lower compartment to the upper compartment. Also, since the feed is preferably discharged from conduit 18 at or near the lower end of tube 20, there will be little or no tendency for solids to pass from the lower compartment to the upper compartment.

To prevent entrained air from interfering with the proper treatment of the pulp, particularly that supplied to a lower compartment, an air pipe 47 may extend through hub 26 and upwardly to a point above the overflow of clarified liquid, so that any air entrained in the pulp fed to the lower compartment will rise to the upper end of tube 20, and be discharged to the atmosphere by bubbling up through the liquid, which will normally rise in tube 47 to a height which will normally approximate that of an overflow discharge from conduits 38.

Due to the accurate control provided by the elevation of the discharge of clarified liquid from the lower compartment, and also by regulation of the rate of withdrawal of settled solids by pump 34, each of the compartments functions as a separate and substantially independent thickener unit, in each of which the density of material under treatment may be closely controlled through elimination of accidental dilution due to short-circuiting, by virtue of the balanced labyrinth seal maintained.

The amount of floor space occupied in a mill, for instance, is decreased over that necessary for separate individual units, since the compartments 12 and 13 are superposed, and contain superposed bodies of solids in liquid, thereby providing a plurality of superposed and physically communicating settling zones. Also, the provision of the overflow conduits, for the elevation of clarified liquid within the tank, eliminates overflow boxes attached to the outside of the tank, which is conventional in structures of this type, thereby reducing the area required by a tank of any given capacity. It will be understood that the capacity of the apparatus may be increased by utilizing a higher tank and additional compartments, without increasing the floor space required. The number of compartments may be varied according to the treatment requirements, as many as six or seven in a single tank being feasible under proper conditions.

Due to the conjoint rotation of the rakes in the superposed compartments by a single shaft, the total power requirements of the thickener units are reduced, and due to a plurality of units being contained in a single tank, all of the operating elements are within easy reach and control, so that the number of operators required is reduced. Furthermore, less attendance on the part of an individual operator is required, since the apparatus tends to operate more nearly automatically as soon as adjustment is made for a given set of conditions.

An additional advantage obtained by use of the labyrinth seal between the compartments lies in the ease with which repairs and cleaning operations can be carried out. Normally, of course, it takes a considerable period of time to pump out a tank or compartment for repairs or cleaning operations, and due to the weight of material, the shell of thickener tanks is usually quite thick. However, the partition 14 may be considerably thinner than would otherwise be necessary, because it is adequately supported by the material in the lower compartment, which extends under the entire lower surface of the partition. When the apparatus is to be shut down for repairs or cleaning purposes, the lower compartment can be operated as an independent unit for a time while the upper compartment is being pumped out, merely by adequate adjustment of the overflow discharge of clarified liquid. As the upper compartment becomes more nearly empty, the lower compartment is closed off to retain material therein to support the partition during the latter stages of emptying the upper compartment, and during cleaning or repair of the upper compartment. If repairs are to be made to the lower compartment, or it is to be cleaned also, it may then be emptied. After cleaning or repairs, in again starting up the apparatus, it is desirable first to fill the lower compartment, so that the partition will be suitably supported as the upper compartment is being filled. This may readily be accomplished by diverting all of the feed temporarily to the lower compartment from the common supply member 16.

It will be understood that various changes may be made in the apparatus of this invention. For instance, the final solids discharge may be at any convenient location, as the elevated discharge merely illustrates an arrangement preferably employed. Variation in the point of discharge is contemplated by the present invention, and the illustrated form is not intended as a limitation on the scope thereof. Likewise, the pumps used for elevating the thickened matter, the means for rotating the shaft 24 driving the rakes, and the lift devices for changing the elevation of the rakes—each may be altered or changed, as desired. The lifting device is advantageous, but is not absolutely essential to the operation in all instances. Also, a motor driven worm is effective for operating rakes in tray-thickeners, but other power sources may be utilized, if desired. In addition, while a diaphragm pump of the type described is highly effective, any type of pump which will effectively elevate the settled matter will be satisfactory for the purpose.

It will further be understood that additional changes and modifications may be made without departing from the spirit and scope of this invention.

What is claimed is:

1. Apparatus for settling solids from fluid suspensions, comprising a tank divided by a partition into upper and lower compartments; means providing an open passage through the partition and between the compartments; means for introducing a measured feed into each compartment; a weir in the upper compartment providing an overflow for clarified liquid; a launder at a side of the weir to receive the overflow; a conduit extending upwardly through the tank and into the launder, having its inlet at the top of the lower compartment and having its outlet at an elevation above the overflow weir, thereby creating a pressure in the open passage in opposition to the hydrostatic pressure acting thereon; and means for separately discharging thickened matter collecting in each of said compartments.

2. Apparatus for settling solids from fluid suspensions, comprising a tank divided by a partition into upper and lower compartments; means providing an open passage through the partition and between the compartments; means for introducing a measured feed into each compartment; a weir in the upper compartment providing an overflow for clarified liquid; a launder at a side of the weir to receive the overflow; a conduit extending upwardly through the tank and into the launder, having its inlet at the top of the lower compartment and having its outlet at an elevation above the overflow weir, thereby creating a pressure in the open passage in opposition to the hydrostatic pressure acting thereon; adjusting means for varying the elevation of the outlet of the conduit; and means for separately discharging thickened matter collecting in each of said compartments.

3. Apparatus for settling solids from fluid suspensions, comprising a tank; a partition dividing the tank into upper and lower settling chambers, and provided with an opening; a tube extending through the opening and above the partition; means for the separate discharge of settled matter from each of said chambers; means in the tank for moving settled matter to the discharge means; means for supplying feed to the respective chambers; a casing for the tube in spaced telescoping relation thereto, the upper chamber having an overflow launder for clarified liquid; and a conduit for the discharge of liquid rising from settled matter in the lower chamber, having a discharge outlet in said launder at a predetermined elevation above the overflow.

4. A method of treating a liquid-solids suspension which comprises establishing a plurality of superposed and physically communicating settling zones; dividing incoming feed and simultaneously supplying a divided portion thereof to each zone; simultaneously removing settled solids separately from the lower portion of each zone; simultaneously removing clarified liquid from the upper portion of each zone; and establishing a pressure seal between adjacent zones to prevent movement of matter from each zone to the next lower zone by discharging clarified liquid from each zone at a point elevated with respect to the uppermost of said zones.

5. The improvement in the method of thickening solids in fluid suspension, which comprises simultaneously maintaining superposed bodies of solids in liquid with a restricted zone of communication between the separated bodies; dividing incoming feed into a separate portion for each body; establishing a pressure in a lower body continuously sealed with respect to the hydrostatic pressure in the body next above, to prevent passage of matter from the body next above to the lower body through such restricted zone, such pressure establishment including the steps of discharging clarified liquid from such lower body at a point elevated with respect to the uppermost of the superposed bodies and withdrawing settled solids from the body next above; and controlling the hydrostatic pressure in such lower body by the point of elevated discharge of clarified liquid, and controlling the rate of withdrawal of solids from the body next above, so as to continuously prevent passage of matter downwardly through said restricted zone.

6. In a method of treating a liquid-solids suspension, establishing a plurality of superposed and physically communicating settling zones; providing a feed for each zone by dividing incoming feed into a separate portion for the respective zones; withdrawing settled solids at a predetermined rate separately from said zones; and discharging clarified liquid from each lower zone at a point elevated with respect to the uppermost of the superposed zones, so as to maintain a pressure seal which prevents the passage of matter from each upper zone to the next lower zone, and also maintain a desired density in such next lower zone.

7. In apparatus for settling solids from fluid suspensions, a cylindrical tank having upper and lower decks providing settling surfaces in the tank and an open passage in the upper deck; rotary scrapers for moving settled matter on each of said surfaces centrally thereof; an element carried by the upper scraper above the upper settling surface and cooperating therewith to define a restricted passage to said open passage; means for delivering feed into the tank at points above each of said settling surfaces; an overflow launder for clarified solution at the top of the tank; conductive means for moving clarified solution rising from settled matter on the respective settling surfaces to the top of the tank and into said launder, and for discharging into the launder some of said clarified solution at a predetermined elevation above the overflow defined by the launder, thereby creating a pressure in the open passage balancing the pressure of settled solids acting thereon and sealing said passage against the descent of solids therethrough; and means including an adjustable stroke diaphragm pump for the separate discharge of solids settling on the respective settling surfaces beyond the tank.

8. In apparatus for settling solids from fluid suspensions, a cylindrical tank having upper and lower decks providing settling surfaces in the tank and an open passage in the upper deck; rotary scrapers for moving settled matter on each of said surfaces centrally thereof; an element carried by the upper scraper above the upper settling surface and cooperating therewith to define a restricted passage to said open passage; means for delivering feed into the tank at points above each of said settling surfaces; an overflow launder for clarified solution at the top of the tank; conductive means for moving clarified solution rising from settled matter on the respective settling surfaces to the top of the tank and into said launder, and for discharging into the launder some of said clarified solution at a predetermined elevation above the overflow defined by the launder, thereby creating a pressure in the open passage balancing the pressure of settled solids acting thereon and sealing said passage against the descent of solids therethrough; and means for the separate discharge of solids settling on the respective settling surfaces beyond the tank.

9. In apparatus for settling solids from fluid suspensions, a cylindrical tank having upper and lower decks providing settling surfaces in the tank and an open passage in the upper deck; rotary scrapers for moving settled matter on each of said surfaces centrally thereof; an element carried by the upper scraper above the upper settling surface and cooperating therewith to define a restricted passage to said open passage; means for delivering feed into the tank at points above each of said settling surfaces; an overflow launder for clarified solution at the top of the tank; conductive means for moving clarified solution rising from settled matter on the respective settling surfaces to the top of the tank and into said launder, and for discharging into said launder some of said clarified solution at a predetermined elevation above the overflow defined by the launder, thereby creating a pressure in the open passage balancing the pressure of settled solids acting thereon and sealing said passage against the descent of solids therethrough; means for varying the elevation of the point of discharge from said conductive means, whereby to change the pressure at the passage; and means for the separate discharge of solids settling on the respective settling surfaces beyond the tank.

10. In apparatus for settling solids from fluid suspensions, a cylindrical tank having upper and lower decks providing settling surfaces in the tank and an open passage in the upper deck; rotary scrapers for moving settled matter on each of said surfaces centrally thereof; an element carried by the upper scraper above the upper settling surface and cooperative therewith to define a restricted passage to said open passage; means for delivering feed into the tank at points above each of said settling surfaces; an overflow launder for clarified solution at the top of the tank; conductive means for moving clarified solution rising from settled matter on the respective settling surfaces to the top of the tank and into said launder, and for discharging into said launder some of said clarified solution at a predetermined elevation above the overflow defined by the launder, thereby creating a pressure in the open passage balancing the pressure of settled solids acting thereon and sealing said passage against the descent of solids therethrough; and means for the separate movement of settled solids from the respective settling surfaces to a common point of discharge outside the tank.

11. Apparatus for settling solids from fluid suspensions, comprising a tank; a partition dividing the tank into upper and lower settling chambers and provided with an opening; a tube fitted in the opening and extending into the upper chamber; means including a pump for the discharge of settled matter separately from each of said chambers; rotary rakes in each of the chambers for moving settled matter to the respective discharge means; means outside the tank constructed and arranged to divide incoming feed and deliver a divided portion thereof to each of said chambers; a casing mounted for conjoint rotation with the rakes of the upper chamber and disposed in spaced encompassing relation to the tube to define therewith a restricted passage to the lower chamber; an overflow launder for clarified liquid in the upper chamber; and a conduit for the discharge of liquid rising from settled matter in the lower chamber constructed and arranged to discharge said liquid into the launder from a predetermined distance above its overflow level, thereby creating a pressure seal within said restricted passage preventing descent of solids through the passage.

12. Apparatus for settling solids from fluid suspensions, comprising a tank; at least one partition dividing the tank into a plurality of superposed settling chambers, each partition having an opening; a tube fitted into each opening and extending into the chamber immediately above; means for introducing feed into each chamber from a common supply member outside the tank; discharge means including a pump for moving sludge collecting adjacent each tube separately to a point of discharge outside the tank; a rotary rake in each chamber for moving settled matter to said discharge means; a casing mounted for conjoint rotation with each rake and disposed in spaced encompassing relation to the respective tubes to define therewith a restricted passage to the chamber immediately below; an overflow launder for clarified liquid in the upper chamber; and a conduit for the discharge of liquid rising from settled matter in each chamber, except the uppermost, having a discharge outlet at a predetermined distance above the overflow level of said launder, thereby creating a pressure seal within said restricted passage preventing descent of solids through the respective restricted passages.

13. Apparatus for settling the solids from liquids having solids in suspension, which comprises a tank structure divided by a partition into a lower compartment and an upper settling compartment vertically disposed immediately above the lower compartment, each compartment adapted to have established therein a sludge bed of settled solids, said partition having a central opening; an upcast boot surrounding said opening and rising from said partition; a hood encircling the boot and constituting therewith hydraulic communication means between the upper and the lower compartment, which communication means is adapted to have trapped therein a substantially stationary column of sludge comprising settled solids; rotary sediment raking mechanism comprising a vertical rotary shaft extending through said boot and said hood and having arms adapted to impel settled solids over said partition to discharge; individually operable means for continuously feeding separately to each compartment liquid having solids in suspension; means for withdrawing settled solids material from the bottom of the upper compartment to a point of discharge from the tank outside the apparatus at a rate low enough to maintain a trapped body of settled solids in said communication means; means for overflowing supernatant liquid separately from each compartment and for discharging said liquid from the apparatus; and means for adjusting the overflow levels with respect to each other and in a manner to control the effective height of the trapped sludge column, said compartments thus being operable in parallel.

14. Apparatus for settling the solids from liquids having solids in suspension, which comprises a tank structure divided by a partition into a lower compartment and an upper settling compartment vertically disposed immediately above the lower compartment, each compartment adapted to have established therein a sludge bed of settled solids, said partition having a central opening; an upcast boot surrounding said opening and rising from said partition, said boot forming with the adjacent surrounding portion of the partition an annular trough-like depression from which collected settled solids are adapted to be withdrawn; a hood encircling the boot and constituting therewith hydraulic communication means between the upper and the lower compartment, which communication means is adapted to have trapped therein a substantially stationary column of sludge comprising settled solids; rotary sediment raking mechanism comprising a vertical rotary shaft extending through said boot and said hood, and having arms adapted to impel settled solids over said partition to discharge; individually operable means for continuously feeding separately to each compartment liquid having solids in suspension; means for withdrawing settled solids material from the trough-like annular depression of the upper compartment to a point of discharge from the tank outside of the apparatus at a rate low enough to maintain a trapped body of settled solids in said communication means; means for overflowing supernatant liquid separately from each compartment and for discharging the liquid from the apparatus; and means for adjusting the overflow levels with respect to each other and in a manner to control the effective height of the trapped sludge column, said compartments thus being operable in parallel.

15. In apparatus for settling solids from fluid suspensions, a partition dividing the tank into upper and lower settling chambers and provided with a central opening; a tube extending through the opening and above the partition; means for the separate discharge of settled matter from each of said chambers; means for feeding a liquid solid suspension separately to each chamber; raking means for moving settled matter to the discharge means; a shaft for rotating the said raking means and extending vertically through said tube; a hub attached to said shaft above said tube; a casing disposed outside said tube in spaced relation thereto and attached to said hub, said casing, hub and tube forming a labyrinth passage between the compartments; a vent conduit extending from the space within said labyrinth seal to a point above the upper level of liquid in said tank; and means for discharging clarified liquid from each of said chambers and from the lower chamber at an elevation such that a pressure seal may be provided in said tube by such discharge elevation, the rate of discharge of settled matter, and the rate of feed.

LELAND H. LOGUE.

REFERENCES CITED

The following references are of record in the file of this patent:

UNITED STATES PATENTS

| Number | Name | Date |
|---|---|---|
| 1,135,997 | Dorr | Apr. 20, 1915 |
| 1,237,745 | Blomfield | Aug. 21, 1917 |
| 1,336,553 | Darrow | Apr. 13, 1920 |
| 1,434,089 | Christensen | Oct. 31, 1922 |
| 1,534,145 | Stedman | Apr. 21, 1925 |
| 1,770,353 | Weber | July 8, 1930 |
| 2,003,357 | Gilchrist | June 4, 1935 |
| 2,064,792 | Fischer | Dec. 15, 1936 |
| 2,239,604 | Harms | Apr. 22, 1941 |
| 2,344,355 | Harms | Mar. 14, 1944 |

FOREIGN PATENTS

| Number | Country | Date |
|---|---|---|
| 84,482 | Austria | June 25, 1921 |
| 110,188 | Great Britain | Oct. 10, 1917 |